Jan. 2, 1934.  A. KEMPER  1,942,062
PROCESS OF REFINING A BENZENOID HYDROCARBON OIL
Filed July 2, 1930
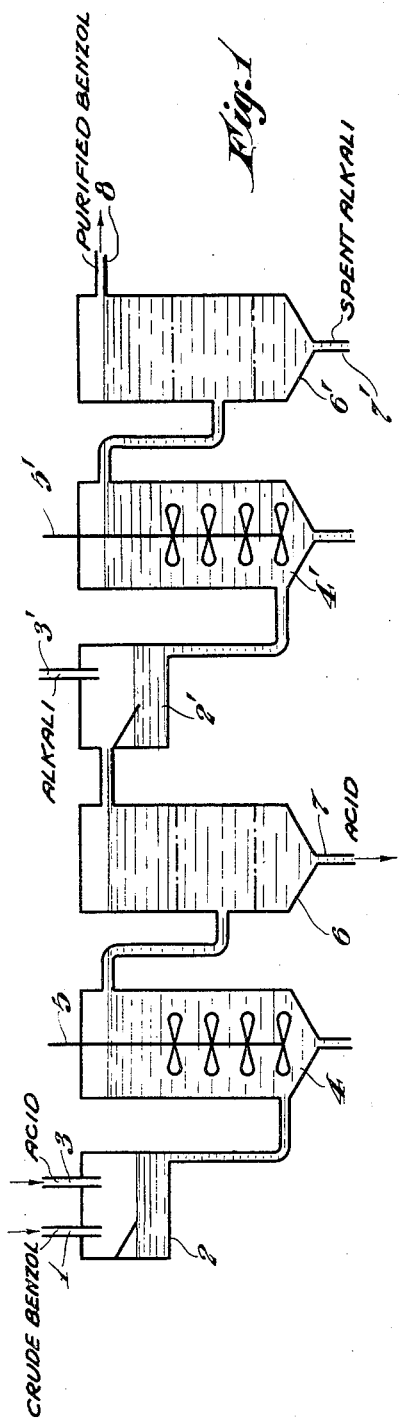
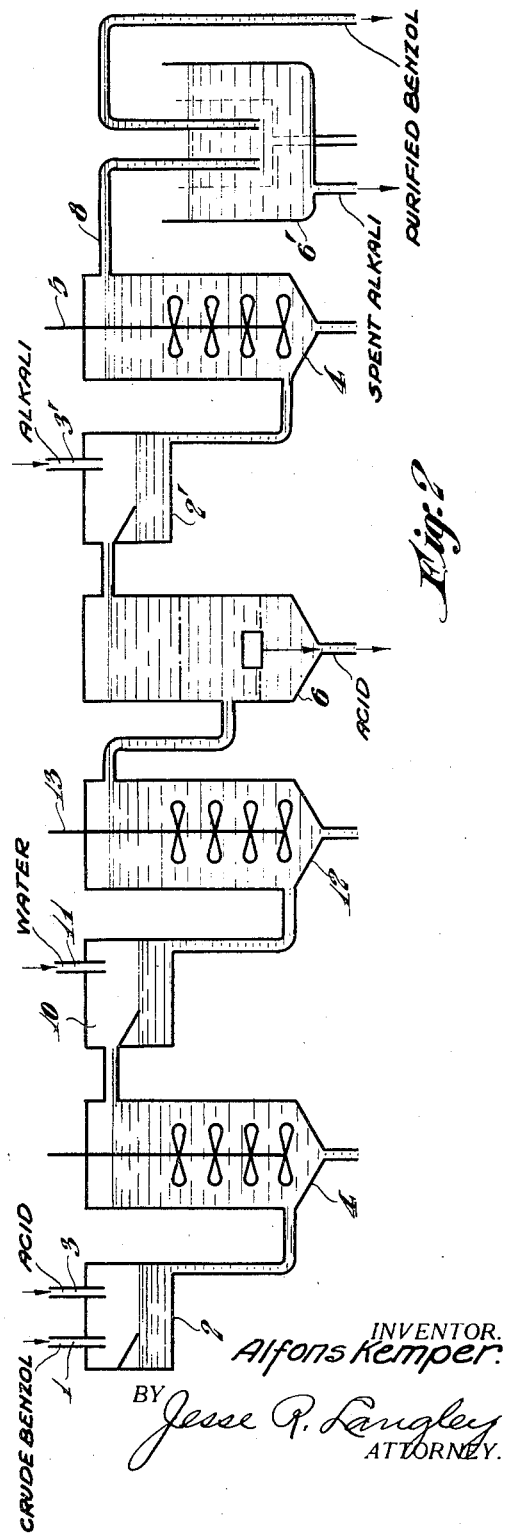
INVENTOR.
Alfons Kemper.
BY Jesse R. Langley
ATTORNEY.

Patented Jan. 2, 1934

1,942,062

UNITED STATES PATENT OFFICE 1,942,062

PROCESS OF REFINING A BENZENOID HYDROCARBON OIL

Alfons Kemper, Essen-Bredeney, Germany, assignor to The Koppers Company of Delaware, a corporation of Delaware Application July 2, 1930, Serial No. 465,308, and in Germany April 26, 1930

4 Claims. (Cl. 196—40)

The object of this invention is the purification of benzene and benzol hydrocarbons with sulphuric acid; also a continuous process of purification. As is well known, benzene and benzol hydrocarbons and their homologues, before they are used for motor fuels or in chemical plants, are subjected to washing with sulphuric acid, whereby the unsaturated hydrocarbons are converted into resin-like compounds, and in the subsequent distillation remain as residues known commercially as coumarone resins. The wash is carried out by mixing the benzol and sulphuric acid in a tank, and agitating violently, and then after shutting down the agitator allowing the sulphuric acid to settle and drawing it off. The washed product is then neutralized by a neutralizing agent, and then distilled. This prior method of operation is discontinuous, that is, a definite quantity of benzol is charged into the tank, purified as described above, and then drawn off.

The present invention contemplates a continuous method of operation, in which the several stages take place in separate units located in series, the benzol flowing from one to the next in series, and receiving a corresponding series of treatments as will be shown hereinbelow.

According to the more simple method of operation described hereinbelow, there are altogether 4 operations as follows:

Operation 1.—Washing with sulphuric acid.
Operation 2.—Settling the sulphuric acid.
Operation 3.—Neutralization.
Operation 4.—Settling the neutralizing agent.

As a separate tank is provided for each operation, four tanks are necessary, as shown diagrammatically in Figure 1. The nature of the invention will be explained by this diagram, the impure product being called "benzol" instead of "benzene and benzol hydrocarbons and their homologues".

The benzol enters at 1 into small mixing tank 2, into which acid flows at 3. The mixing tank 2 is not essential for the invention. Its insertion is preferred as is that of a second mixing tank 2'. The benzol and acid mixture then enters at the bottom of tank 4, which is provided with an agitator, and is here stirred violently by agitator 5. The agitator is so designed that the mixture cannot settle and separate any place in tank 4. The rate of flow through tank 4 is so adjusted that with violent stirring the washing is sufficient to bring the benzol to the desired point of purification.

During the washing the sulphuric acid is enriched with the resinified unsaturated hydrocarbons. The mixture of benzol, acid, and resins combined with the acid, leaves tank 4 at the top, and enters tank 6 at the middle. Tank 6 does not contain an agitator, so that here the mixture can settle and separate. As the rate of flow is uniform, the size of tank 6 is so chosen that the rate of flow is sufficient to effect complete separation of sulphuric acid, and the absorbed resins from the benzol. In tank 6 there are three layers, namely, the bottom layer of acid rich in resins, a middle layer, consisting of a mixture of benzol and the acid rich in resins, and a top layer of pure benzol. The sulphuric acid runs off continuously at 7, and the rate of flow must be throttled so that the layers as described remain in the tank in spite of the slow rate of flow.

The remaining part of the apparatus of Fig. 1 is the same as described above. The benzol now enters mixing tank 2', in which it is mixed with a neutralizing agent such as a solution of caustic soda which is admitted at 3'. The mixture of benzol and caustic soda enters tank 4', is stirred violently by agitator 5', flows into tank 6' in which it settles so that the caustic can settle and run off at 7', and the purified benzol then leaves at 8.

The dimensions of tanks 4' and 6', and the discharge orifices 7 and 7' are so designed that the benzol remains in each tank a sufficient time for each operation.

In the method of operation described hereinabove with reference to Fig. 1 the sludge leaves tank 6 enriched in resins, and in such a form that it cannot be used. The invention provides for the insertion of an additional tank in which a further operation is arranged by means of which the sulphuric acid although diluted, leaves free from resin and so is useful for other purposes, for example, in ammonia manufacture. Namely, if water is added to the mixture of benzol and acid before the acid settles, and preferably if the quantity of water added is double that of the acid used, both on a volume basis, then the result is obtained that the resins absorbed by the acid separate and become benzol-soluble. The resins therefore remain in solution in the benzol, and in the subsequent distillation, are mixed with the rest of the distillation residue without changing their structure appreciably.

In Figure 2 this method of operation is indicated diagrammatically. It is only necessary to add another tank with an agitator to realize the second principle of the invention. Following tank 4 another mixing tank 10 is inserted in which water is added at 11 to the mixture of benzol and acid. The mixture of benzol, acid and water enters tank 12, and is stirred violently by agitator 13. The whole mixture enters tank 6 in which it settles and separates. Here, also three layers separate as in the former description. Now, however, the bottom layer is a clear, although dilute waste acid, the middle layer is the unseparated mixture, and the top layer is the purified benzol, which has absorbed the resins from the acid in a benzol-soluble form. Then the benzol is neutralized in tank 4' as above, and the caustic separated in tank 6' which in the present instance is shown as a centrifuge and run off.

According to this method of operation it is preferred not to use a highly concentrated sulphuric acid for washing, but a weaker acid whose strength must be determined previously by laboratory experiment. Naturally, the quantity of acid and the time of washing must be chosen correspondingly.

As disclosed in the copending application of Paul Damm, Serial No. 479,084, filed August 30, 1930, now U. S. Patent No. 1,817,804, it is preferred to employ an acid of from 60° to 65.5° Baumé. I have found however that unless this acid is still further diluted by the addition of water while the acid is in contact with the benzol, the best results are not obtained.

The method of operation shown in the diagram may be practiced in other forms without deviating from the principle of the invention. For example, the small mixing tanks which are designated in the sketch as 2, 2' and 10 may be omitted. Instead of the mechanical agitator, other types of agitators may be used, instead of the settling tank designated in Fig. 1 at 6 a centrifuge may be used for separating the mixture of liquids as shown at 6' in Fig. 2. It is only essential that the operations take place in tanks which are separate, but which are connected by pipe lines or overflows through which the benzol can flow continuously.

I claim as my invention:

1. In the process of refining benzenoid hydrocarbon oil the steps which comprise agitating the oil with 60° to 65.5° Baumé acid, then agitating the mixture of oil and acid with a volume of water considerably in excess of that of the acid, and then separating the thereby purified oil from the thereby diluted acid, whereby materials originally present as impurities in the oil are converted into unobjectionable products of higher boiling points and are retained as such by said oil.

2. In the process of refining benzenoid hydrocarbon oil the steps which comprise agitating the oil with 60° to 65.5° Baumé acid, then agitating the mixture of oil and acid with a volume of water equal to about twice the volume of the acid, and then separating the thereby purified oil from the thereby diluted acid, whereby materials originally present as impurities in the oil are converted into unobjectionable products of higher boiling points and are retained as such by said oil.

3. The process of refining benzenoid hydrocarbon oil which comprises agitating the oil with 60° to 65.5° Baumé sulphuric acid, then agitating the mixture of oil and acid with a volume of water equal to twice the volume of said acid, whereby the bulk of the materials originally present as impurities in the oil are converted into products soluble in said oil but of low volatility as compared with the volatility of the constituents comprising the bulk of the oil, separating the aqueous liquid from the oil, neutralizing the oil and then subjecting the oil to a distillation operation whereby said more volatile constituents comprising the bulk of the oil are volatilized and separated from said products of conversion, and condensing the thereby purified constituents of the oil.

4. The process of refining a benzenoid hydrocarbon oil which comprises continuously commingling a flow of said oil with a flow of sulphuric acid of 60° to 65° Baumé, subjecting said commingled flow of acid and oil to agitation, then commingling with said flow of oil and acid a flow of water in an amount considerably greater than that of the acid, subjecting the entire flow of oil and thereby diluted acid to further agitation, and finally separating said flow of oil and said diluted acid into streams of oil and diluted acid, respectively.

ALFONS KEMPER.